United States Patent
Kim et al.

(10) Patent No.: US 9,087,328 B2
(45) Date of Patent: Jul. 21, 2015

(54) MOBILE TERMINAL AND PAYMENT METHOD THEREOF

(75) Inventors: Pilsang Kim, Seoul (KR); Jaewan Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/536,531

(22) Filed: Jun. 28, 2012

(65) Prior Publication Data

US 2013/0040563 A1 Feb. 14, 2013

(30) Foreign Application Priority Data

Aug. 11, 2011 (KR) .................. 10-2011-0079971

(51) Int. Cl.
 *H04B 5/00* (2006.01)
 *G06Q 20/32* (2012.01)
 *G06Q 20/34* (2012.01)

(52) U.S. Cl.
 CPC ........ *G06Q 20/3278* (2013.01); *G06Q 20/3572* (2013.01)

(58) Field of Classification Search
 CPC .................................................. G06F 21/445
 USPC ............... 455/41.1, 41.2, 405, 406, 410, 411, 455/556.1; 705/1.1, 67
 See application file for complete search history.

(56) References Cited

U.S. PATENT DOCUMENTS

| | | | |
|---|---|---|---|
| 7,207,480 B1 | 4/2007 | Geddes .......................... | 235/380 |
| 7,493,288 B2 * | 2/2009 | Biship et al. .................... | 705/50 |
| 8,352,313 B2 * | 1/2013 | Pratt et al. ...................... | 705/13 |
| 2006/0074698 A1 | 4/2006 | Bishop et al. ..................... | 705/1 |
| 2008/0313082 A1 | 12/2008 | Van Bosch et al. ............. | 705/50 |
| 2009/0015703 A1 | 1/2009 | Kim et al. ................ | 348/333.12 |
| 2009/0144161 A1 | 6/2009 | Fisher ............................ | 705/16 |

FOREIGN PATENT DOCUMENTS

WO   WO 2010/036017 A2   4/2010

OTHER PUBLICATIONS

"MasterCard Announces NFC Trial in Dallas"; Card Technology Today; vol. 18; No. 11-12; Nov. 1, 2006; p. 7 (XP 025014687).
Hyppönen, et al.; "Pseudonymous Mobile Identity Architecture Based on Government-Supported PKI"; 2008 The Institution of Engineering and Technology; Lecture Notes in Computer Science/Computational Science, Springer DE, vol. 4968, Mar. 1, 2008, pp. 107-118   http://www.springerlink.com/content/t03x356351143v/fulltext.pdf (XP 002544369).
Laukkanen, Mikko et al.; "Towards Operating Identity-based NFC Services"; IEEE International Conference on Pervasive Services; Jul. 1, 2007, pp. 92-95 (XP 031123208).
European Search Report dated Dec. 19, 2013 issued in Application No. 12 17 8863.

* cited by examiner

*Primary Examiner* — Tuan H Nguyen

(74) *Attorney, Agent, or Firm* — KED & Associates LLP

(57) ABSTRACT

A mobile terminal has a memory, short-range communication interface, and a controller. The memory stores payment information and the controller compares predetermined first authentication information with second authentication information. The controller enables or disables a payment function based on a result of the comparison, and establishes a connection with a payment terminal through the short-range communication interface when the payment function is enabled. Once the connection is established, the payment information is transmitted to the payment terminal through the short-range communication interface.

12 Claims, 21 Drawing Sheets

(a)

(b)

(a)

(b)

MOBILE TERMINAL AND PAYMENT METHOD THEREOF

CROSS-REFERENCE TO RELATED APPLICATIONS

This application claims benefit of and priority to Korean Patent Application No. 10-2011-0079971, filed Aug. 11, 2011, the subject matter of which is incorporated herein by reference.

BACKGROUND

1. Field

One or more embodiments described herein relate to an information terminal.

2. Background

A variety of information terminals have been developed. These terminals include, for example, handheld terminals and vehicle-mounted terminals which may operate based on a variety of communication protocols. In spite of their prevalence, a need exists for new applications and uses for these terminals.

SUMMARY

In accordance with one embodiment, a mobile terminal comprises a memory to store payment information; a short-range communication interface; and a controller to compare predetermined first authentication information with second authentication information, to enable or disable a payment function based on a result of comparing the first and second authentication information, to establish a connection with a payment terminal through the short-range communication interface when the payment function is enabled, and to transmit the payment information to the payment terminal through the short-range communication interface, wherein the second authentication information is received through an input interface.

The short-range communication interface establishes a communication link in a range of substantially 10 centimeters or less and may include a near field communication (NFC) interface. The input interface may be an input unit of the mobile terminal.

Additionally, the mobile terminal may include a screen to display a user identification image in response to a payment request input through the short range communication interface. The controller is to transmit an image for user identification to the payment terminal through the short range communication interface for display on the payment terminal.

Additionally, an interface may be included to establish a connection between the mobile terminal and an identification storage that stores the first authentication information, wherein: the first authentication information stored in an encrypted form, and the controller acquires the first authentication information by decrypting the encrypted first authentication information with an encryption key.

The mobile terminal may also include a mobile communication module or a wireless Internet module, wherein the controller acquires the encryption key from an authentication server connected through the mobile communication module or the wireless Internet module, or the identification module.

When a payment amount exceeds a predetermined amount, the controller may enable or disable the payment function based on the comparing result of the first and second authentication information. When the payment amount is less than the predetermined amount, the controller may enable the payment function regardless of the comparing result of the first and second authentication information.

In accordance with another embodiment, a mobile terminal comprises a memory to store payment information; a short-range communication interface; and a controller to establish a connection with a payment terminal through the short-range communication interface. The controller also transmits predetermined first authentication information with the payment information to the payment terminal through the short-range communication interface for performing user authentication. The short-range communication interface establishing a communication link in a range of substantially 10 centimeters or less. The short-range communication interface may be or include a near field communication (NFC) interface.

Additionally, the mobile terminal may include a screen to display an image for user identification in response to a payment request received through using the short-range communication interface. The controller may transmit an image to the payment terminal through the short-range communication interface for user authentication.

Additionally, the mobile terminal may include an interface to connect the mobile terminal to an identification module that stores the first authentication information, wherein: the first authentication information is encrypted, and the controller acquires the first authentication information by decrypting the encrypted first authentication information with an encryption key. The payment terminal may perform user authentication by comparing second authentication information with the first authentication information.

In accordance with another embodiment, a payment method for a mobile terminal includes acquiring predetermined first authentication information; receiving second authentication information; comparing the first authentication information with the second authentication information to enable or disable a payment function performed based on information transmitted through a short-range communication interface of the mobile terminal, and transmitting payment information from the mobile terminal to a payment terminal through the short-range communication interface when the payment function is enabled. The short-range communication interface is or includes a near field communication (NFC) interface, and may have a range of substantially 10 centimeters or less.

In accordance with another embodiment, a payment method of a mobile terminal includes connecting the mobile terminal to a payment terminal through the a short-range communication interface; acquiring predetermined authentication information; and transmitting the authentication information with payment information to the payment terminal such that the payment terminal performs user authentication. The short-range communication interface is or includes a near field communication (NFC) interface and may have a range of substantially 10 centimeters or less. The authentication information may be or include a user image.

DETAILED DESCRIPTION

Figure 1:
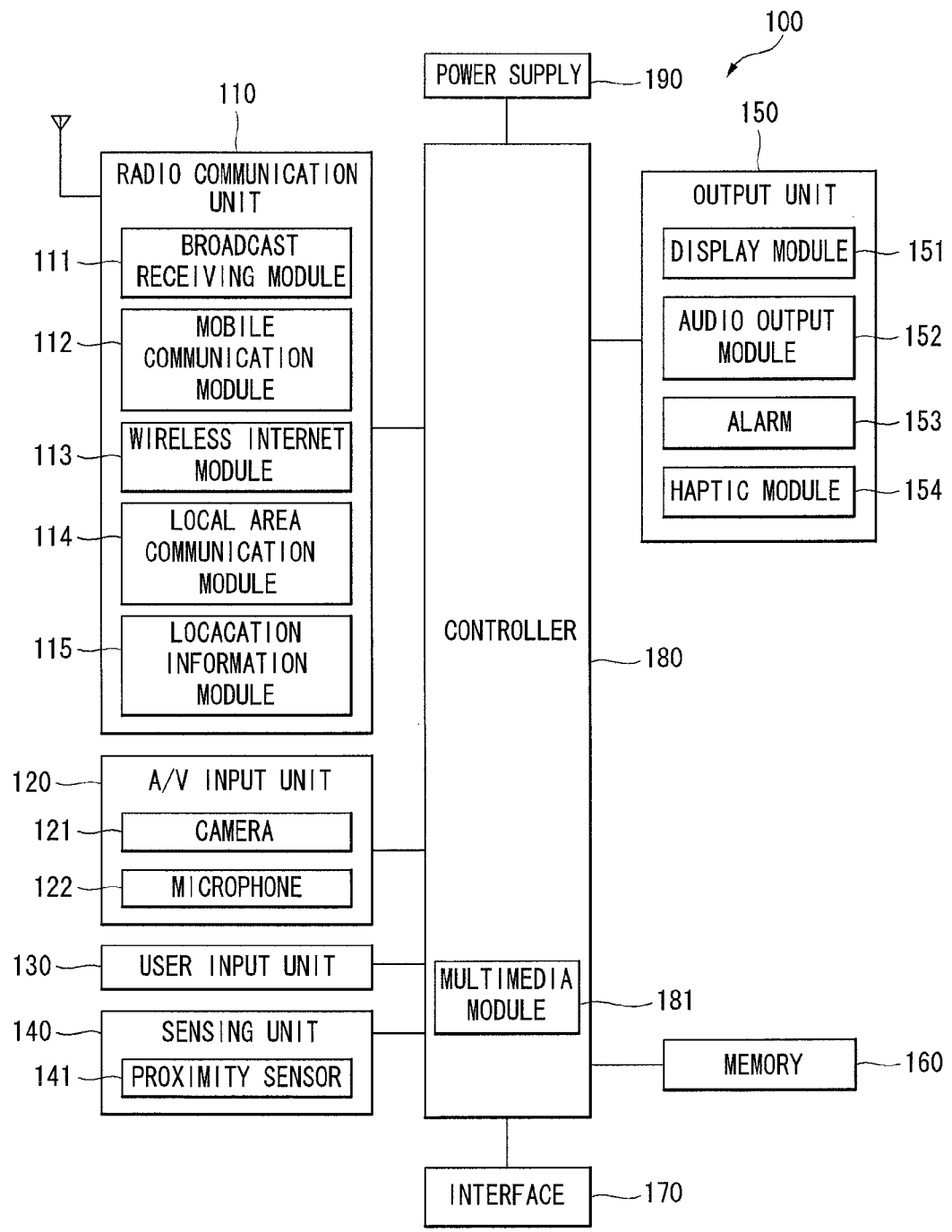
FIG. 1 shows one embodiment of a mobile terminal.

FIG. 1 shows a first embodiment of a mobile terminal 100 which includes a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or Zig-Bee™ may be used as a local area communication technique.

The position-location module 115 may confirm or obtain the position of the mobile terminal 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures obtained by an image sensor in a video call mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100.

For example, if the mobile terminal 100 is a slide phone, sensing unit 140 may sense whether the slide phone is opened or closed. Further, sensing unit 140 may sense whether power supply 190 supplies power and/or whether interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of mobile terminal 100.

The mobile terminal 100 may also include at least two display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the mobile terminal 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be considered as a proximity sensor 141.

For the convenience of description, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating controller 180 and temporarily store input/output data such as a phone book, messages, still images, and/or moving pictures. The memory may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the mobile terminal 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
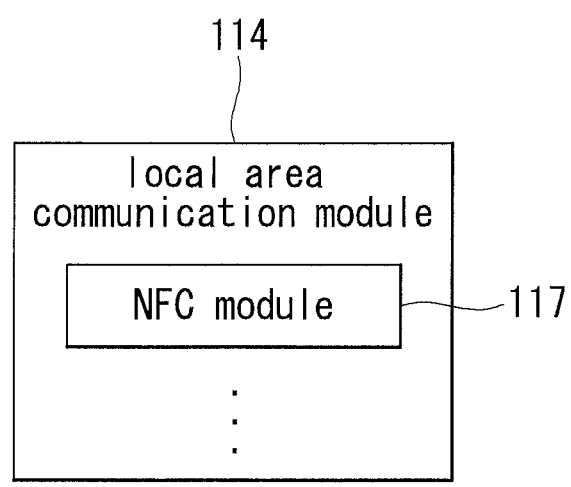
FIG. 2 shows one embodiment of a local area communication module of that may be used in a mobile terminal.

FIG. 2 shows one embodiment of the local area communication module 114 of mobile terminal 200. The local area communication module 114 may include a near field communication (NFC) module 117. The NFC communication module is a radio frequency identification protocol which performs data communication with devices located at short distances (e.g., 10 cm or shorter) using a short-range contactless data transfer technology. According to one embodiment, NFC may perform data communication with devices at a distance of 4 cm or shorter.

The NFC module 117 can communicate with NFC modules of other electronic devices in various modes. For example, these modes may include a card emulation mode, a reader mode, and a peer-to-peer mode.

When the NFC module 117 of the mobile terminal 100 operates in the card emulation mode, the NFC module 117 can function as a card, that is, a tag. In this case, an NFC module of an electronic device, which communicates with the NFC module 117, can operate in the reader mode to acquire data from NFC module 117 of mobile terminal 100.

When the NFC module 117 of the mobile terminal 100 operates in the reader mode, the NFC module 117 can function as a reader. In this case, the NFC module 117 of the mobile terminal 100 can receive data from an NFC communication module of another electronic device operating in the emulation mode.

When the NFC module 117 of the mobile terminal 100 operates in the peer-to-peer mode, the NFC module 117 of the mobile terminal 100 can exchange data with an NFC module of another electronic device.

The mode of the NFC module 117 of the mobile terminal 100 may be determined according to predetermined criteria. For example, the mode of the NFC module 117 can be set according to a user input or a predetermined algorithm.

Figure 3:
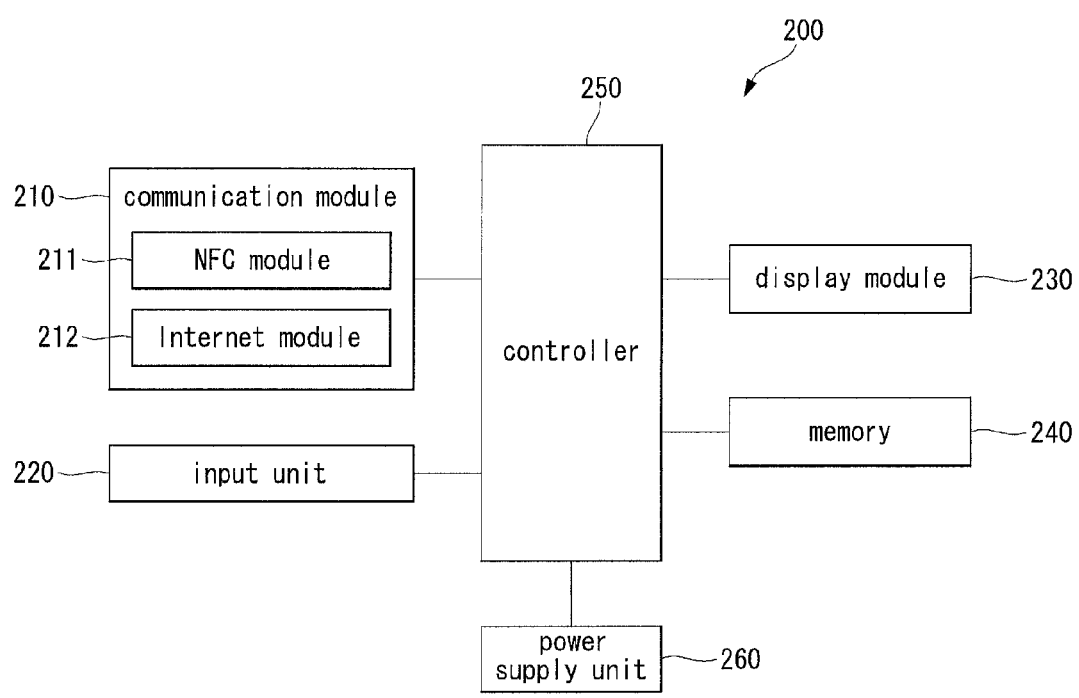
FIG. 3 shows one embodiment of a payment terminal.

FIG. 3 shows one embodiment of a payment terminal 200 serving as an electronic device that forms an NFC link with mobile terminal 100. As shown in FIG. 3, payment terminal 200 may include a communication unit 210, an input unit 220, a display unit 230, a memory 240, a controller 250, and a power supply unit 260. All the components in FIG. 3 are not essential elements and payment terminal 200 can be implemented with an increased number of components or a decreased number of components.

The communication unit 210 may include an NFC module 211, an Internet module 212, etc. The NFC module 211 performs NFC communication with another electronic device. The Internet module 212 is configured to access the Internet in a wireless or wired manner. The payment terminal 200 can communicate with an external service through the Internet module 212.

The input unit 220 receives external signals and may include a camera that receives external images, a microphone that receives external audio signals, and a user input unit for receiving a control input of a user. The user input unit may include a keypad, a dome switch, a touch pad, a jog wheel, a jog switch, etc.

The display unit 230 displays information processed in the payment terminal 200. For example, when the payment terminal 200 carries out payment, the display unit 230 displays UI or GUI involved the progress of payment. The display unit 230 of the payment terminal 200 may be implemented in the form of a touch-screen that can be used as an input unit as well as an output unit as in the mobile terminal 100.

The memory 240 may store programs for operations of the controller 250 of the payment terminal 200 and temporarily store input/output data (e.g., payment information, authentication information, and user image).

The controller 250 controls the overall operation of the payment terminal 200. For example, the controller 250 performs control and processing involved in payment.

The power supply unit 260 receives external power and internal power and supplies power required for operations of the components under the control of the controller 250.

Figure 4:
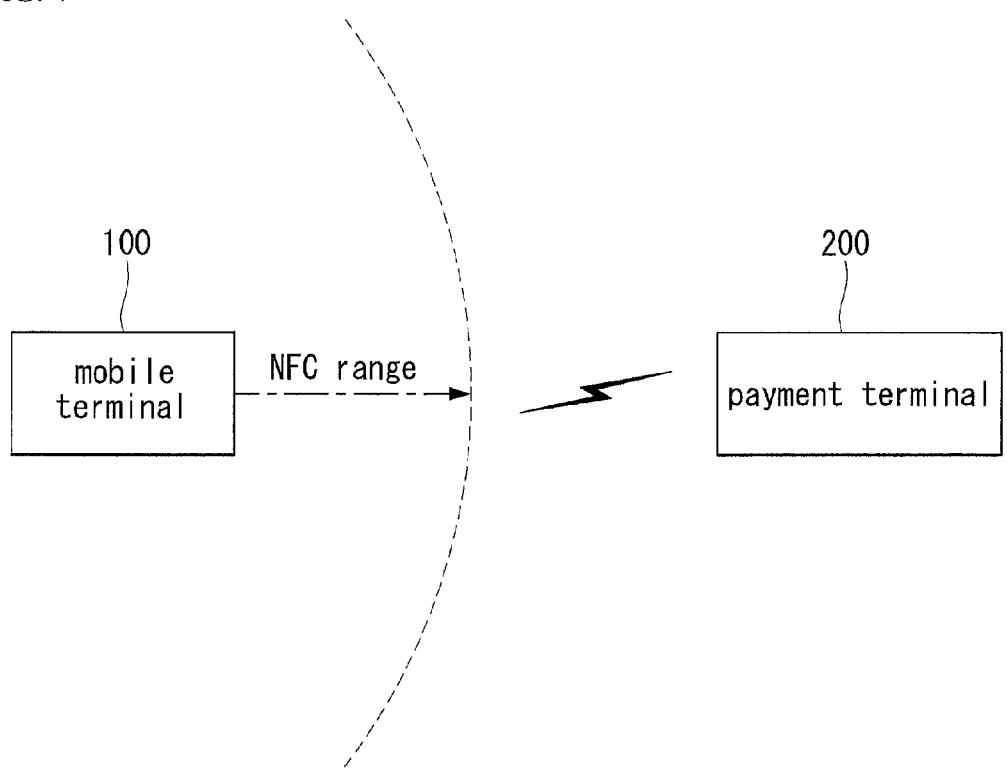
FIG. 4 shows one embodiment of a system environment.

FIG. 4 shows one embodiment of a system environment that includes mobile terminal 100 and payment terminal 200 that can establish an NFC link with the mobile terminal 100. The mobile terminal 100 and payment terminal 200 are not essential components of the system environment and a component (or components) can be added to or a component can be removed from the system environment.

Referring to FIG. 4, the mobile terminal 100 can be linked to the payment terminal 200 that supports NFC through the NFC module 117. That is, the mobile terminal 100 can establish an NFC link with the payment terminal 200 supporting NFC via the NFC module 117. The NFC module 117 of the mobile terminal 100 can establish the NFC link with the NFC module 211 of the payment terminal 200 through tagging within an NFC range, as shown in FIG. 4.

In a hardware configuration, one or more embodiments may be implemented by at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electronic units for executing functions. In some instances, the embodiments can be implemented by the controller 180.

In a software configuration, one or more embodiments can be implemented by a type of a module, a procedure, or a function, which performs functions or operations described above. Software code may be implemented by a software application written by an appropriate program language. The software code may be stored in memories 160 and 240 and then may be executed by the controllers 180 and 250.

A first embodiment of a payment method and corresponding operations performed by the mobile terminal 100 and payment terminal 200 may be described relative to FIGS. 1 to 4.

According to the first embodiment, memory 160 may store payment information and authentication information, a user image, etc. used for user authentication involved in an NFC payment function. The payment information may include information on payment means such as account transfer, credit card, phone number, etc. The payment information may be input or deleted by a user. The authentication information involved in the NFC payment function can be used for user authentication to prevent illegal NFC payment and may include a signature, password, voice information of a user, bio information of the user, and the like.

The authentication information and user image used for user authentication involved in the NFC payment function may be stored in an identification module connected to the mobile terminal 100. In this case, the interface 170 may acquire the authentication information and user image involved in the NFC payment function and stored in the identification module through interface with the identification module connected to the mobile terminal 100.

The authentication information and user image may be encrypted and then stored in the memory 160 and the identification module. In this case, an encryption key used to decode the encrypted authentication information and user image may be stored separately from the encrypted authentication information.

For instance, when the encrypted authentication information is stored in the memory 160, the encryption key may be stored in the identification module or an external authentication server. If the encrypted authentication information is stored in the identification module, the encryption key may be stored in the external authentication server or the memory 160.

When the encryption key is stored in the external authentication server, the encryption key can be acquired by connecting the mobile terminal 100 to the authentication service through the mobile communication module 112 or the wireless Internet module 113.

The controller 180 may acquire predetermined authentication information when receiving an NFC payment request. In addition, the controller 180 may receive authentication information involved in the NFC payment function from a user. The controller 180 may determine whether or not to enable the NFC payment function according to success or failure of authentication. For example, the controller 180 can end an NFC payment operation or deactivate the NFC module 117 to disable the FNC payment function if user authentication ends in failure.

If user authentication is successfully executed, the controller 180 can transmit payment information stored in the memory 160 to the payment terminal 200 linked with the mobile terminal 100 through the NFC module 117 to perform payment.

Furthermore, the controller 180 may display a user image previously set for NFC payment on the screen of the mobile terminal 100 such that a manager of the payment terminal 200, such as a clerk, can confirm the user of the mobile terminal 100.

The controller 180 may selectively perform the above-described user authentication process depending on a payment amount, or carry out user authentication using different pieces of authentication information depending on a payment amount.

In the former case, the controller 180 may perform the above-mentioned user authentication process only when the amount of money larger than a predetermined amount is charged. In this case, the predetermined amount may be set by a user.

In the latter case, different pieces of authentication information may be set by amounts and the controller 180 performs user authentication using authentication information corresponding to a charged amount.

Figure 5:
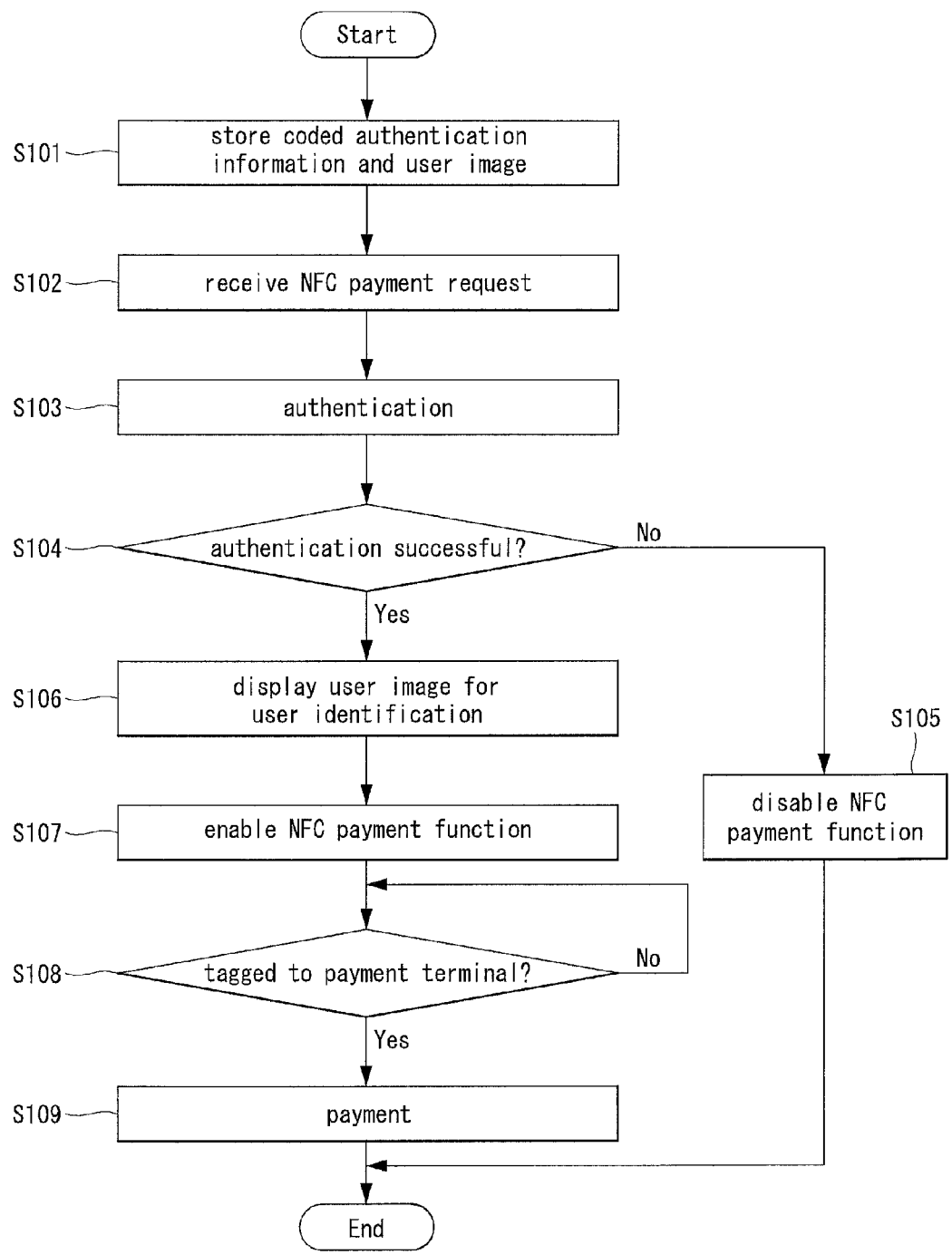
FIG. 5 shows operations in a first embodiment of a payment method.

FIG. 5 shows operations in one embodiment of the payment method performed by mobile terminal 100 and FIGS. 6 to 9 further describe this payment method performed by the mobile terminal.

Referring to FIG. 5, the controller 180 of the mobile terminal 100 stores authentication information and a user image involved in the NFC payment function in the memory 160 or the authentication module included in the mobile terminal 100 (S101).

The authentication information and the user image involved in the NFC payment function may be stored in the memory 160 or the identification module through an approved method for security. For example, the authentication information and the user image involved in the NFC payment function may be stored in the memory 160 or the authentication module in an approved place such as an authorized store, a service center, etc. through a service terminal that can be linked with a network operator server.

Furthermore, the authentication information and the user image involved in the NFC payment function may be stored in the memory 160 or the identification module after an identification procedure using a certificate installed in the mobile terminal.

In step S101, the authentication and the user image may be encrypted and then stored in the memory 160 or the identification module. In this case, an encryption key for decoding the encrypted authentication information and user image may be stored separately from the encrypted authentication information and user image, as described above.

Referring back to FIG. 5, the controller 180 receives a payment request using NFC (S102). The NFC payment request may be input by the user through the user input unit 130 of the mobile terminal 100. For example, the user may request NFC payment by pressing a specific key button or touching a specific icon corresponding to a function of executing an NFC payment application.

Alternatively, the NFC payment request may be input from the payment terminal 200. For instance, the user tags the mobile terminal 100 to the payment terminal 200 such that the controller 180 can receive the NFC payment request from the payment terminal 200 through the NFC module 117.

Figure 6:
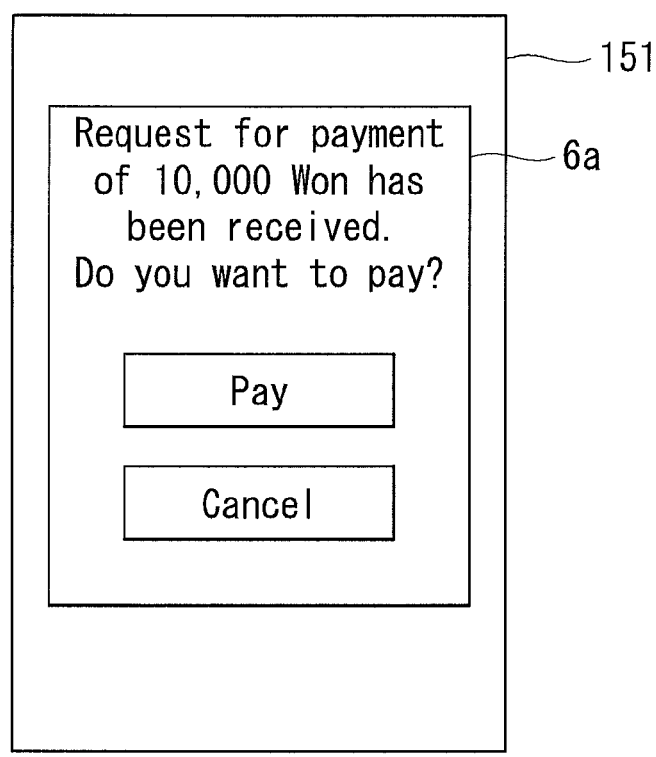
FIGS. 6 to 9 show features of the first embodiment of the payment method.

Upon reception of the NFC payment request from the payment terminal 200, the controller 180 may output a message or a sound that indicates the payment request received from the payment terminal 200 so as to inform the user that the payment request has been received. Referring to FIG. 6, the controller 180 can display a message 6a indicating that a payment request has been received from the payment terminal 200 on the screen of the mobile terminal 100.

Figure 7:
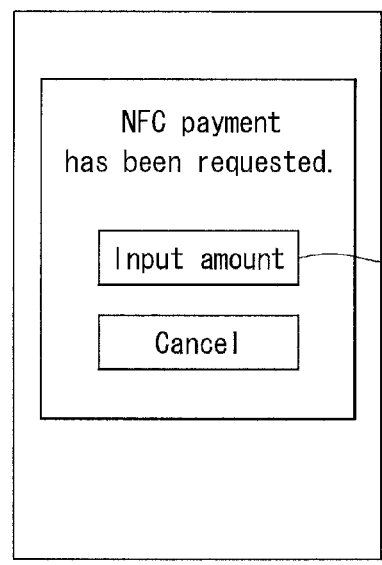
Figure 7:
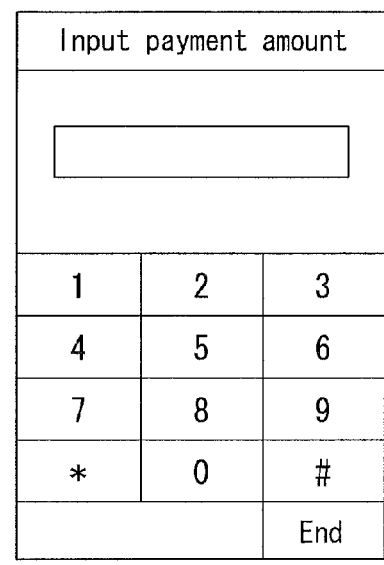

Referring back to FIG. 5, the controller 180 may receive information on a charged amount with the payment request in step S102. The controller 180 may directly receive the information on the charged amount from the user through the user input unit 130. Referring to FIG. 7, the controller 180 displays a window (a) indicating that an NFC payment request has been received from the user. Upon selection of amount input 7a by the user, the controller 180 displays a charged amount input screen (b). Accordingly, the user can input an amount to be paid through the charged amount input screen (b).

Furthermore, the controller 180 may receive the information on the charged amount from the payment terminal 200. Referring to FIG. 6, the controller 180 may receive the information on the charged amount with the payment request from the payment terminal 200 when receiving the payment request. The controller 180 may display the received charged amount information with the message 6a representing that the payment request has been received from the payment terminal 200 to inform the user of the amount to be paid.

Referring back to FIG. 5, the controller 180 performs user authentication (S103) upon reception of the NFC payment request in step S102. A method of performing user authentication will be described in detail later with reference to FIG. 10.

Upon failure of user authentication, the controller 180 disables the NFC payment function (S104 and S105). For example, the controller 180 can disable the NFC payment function by ending an NFC payment program. Otherwise, the controller 180 can control the NFC module 117 to deactivate establishment of a communication link by the NFC module 117 to disable the NFC payment function.

Conversely, upon success of user authentication, the controller 180 acquires the user image used for user identification and displays the acquired user image on the screen of the mobile terminal 100 through the display module 151 (S104 and S106).

Figure 8:
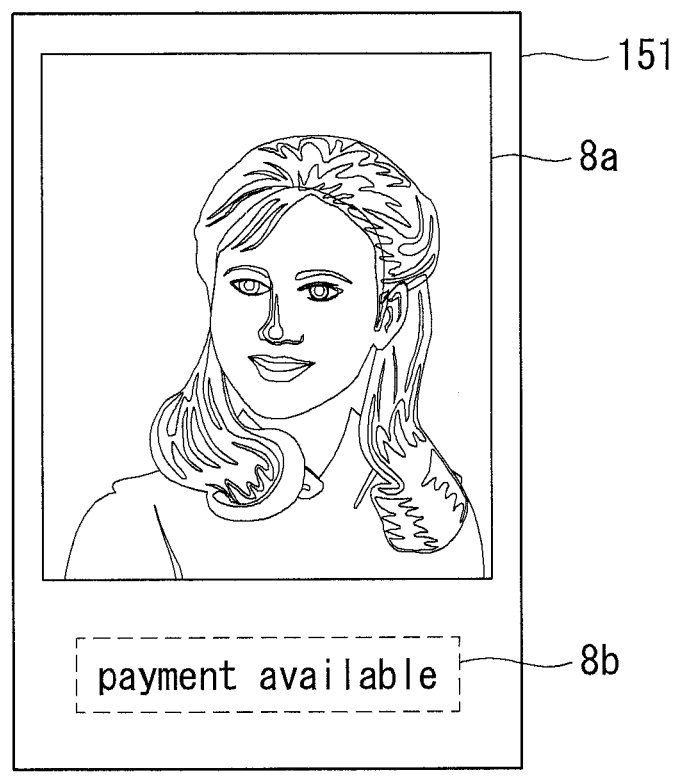

Referring to FIG. 8, the controller 180 acquires a predetermined user image 8a upon success of user authentication and displays the user image 8a on the screen of the screen of the mobile terminal 100 through the display module 151 such that the user image can be used to identify the user of the mobile terminal 100. That is, the user can show the user image 8a displayed on the screen of the mobile terminal 100 to a store clerk, for example, such that the clerk can confirm whether the user is the authenticated user of the mobile terminal 100.

The user image used for user authentication involved in the NFC payment function may be encrypted and then stored in the memory 160 or the identification module, as described above. Accordingly, the controller 180 acquires the encrypted user image from the memory 160 or the identification module and decodes it using an encryption key. The encryption key used to decode the user image may be acquired from the identification module or the external authentication server, as described above.

While step S106 of displaying the user image is performed upon success of user authentication in the first embodiment of the invention, the present invention is not limited thereto and step S106 may be executed prior to the user authentication. For example, the controller 180 can display the user image on the screen of the mobile terminal 100 upon input of the NFC payment request (S102).

Referring back to FIG. 5, the controller 180 enables the NFC payment function (S107) upon success of user authentication in step S103. Specifically, the controller 180 can control the NFC module 117 to maintain a standby state for connecting the mobile terminal 100 to the payment terminal 200 through the NFC module 117 to enable the NFC payment function.

When the payment terminal 200 is tagged to the NFC module 117 with the NFC payment function enabled (S108), that is, when the mobile terminal 100 accesses the payment terminal 200 within a predetermined distance, the controller 180 establishes a communication link with the NFC module of the payment terminal 200 through the NFC module 117. Then, the controller 180 transmits payment information stored in the memory 160 to the payment terminal 200 through the communication link to perform payment (S109).

When a plurality of payment methods is stored in the memory 160, the controller 180 may select one of the plurality of payment means on the basis of a user input and transmit payment information corresponding to the selected payment method to the payment terminal 200 in step S109.

Figure 9:
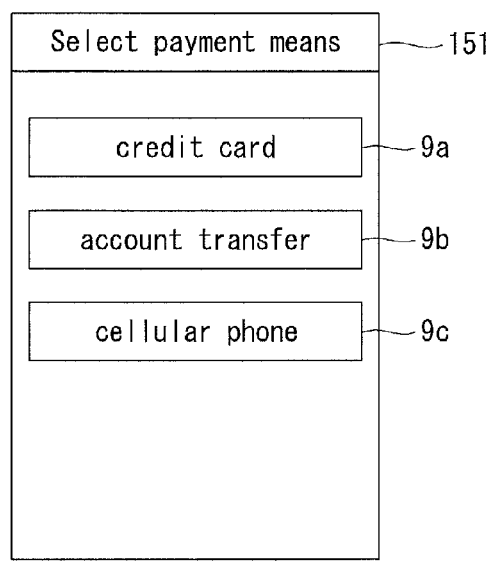
Figure 9:
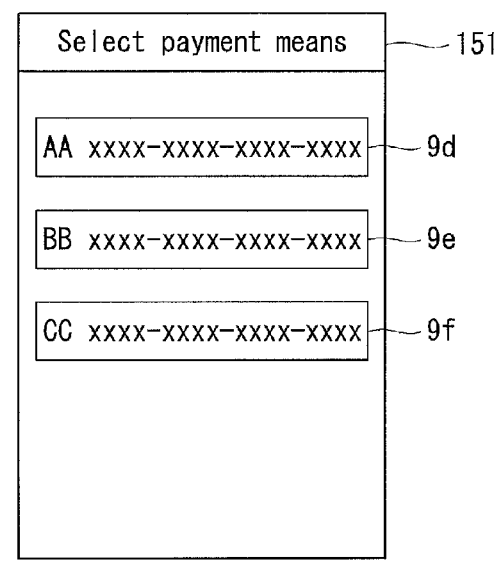

Referring to FIG. 9, the controller 180 displays a screen for selecting payment means such as credit card 9a, account transfer 9b and cellular phone 9c in response to the NFC payment request.

Upon selection of one of the payment methods, for example, credit card 9a, the controller 180 displays a list of previously registered credit cards 9d, 9e and 9f on the screen. Accordingly, the user can select one of the credit cards 9d, 9e and 9f as a method of payment. According to one embodiment, a method of payment may be selected before or after the step S102 of receiving the payment request. Alternatively, the payment method may be selected when the user authentication is successfully executed in step S103.

Figure 10:
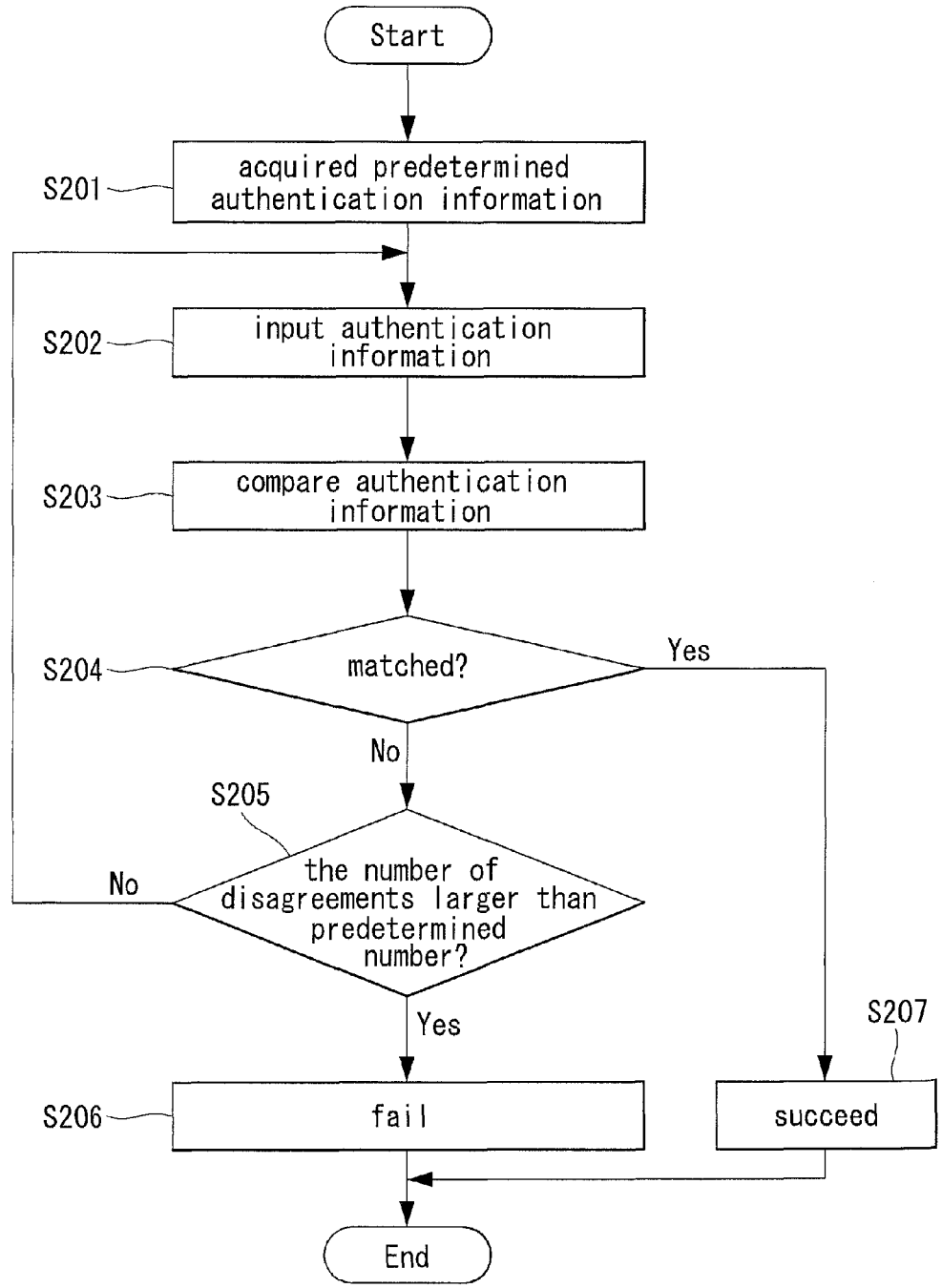
FIG. 10 shows operations in one embodiment of an authentication process performed by a mobile terminal.

FIG. 10 shows one embodiment of an authentication process performed by mobile terminal 100 in step S103 of FIG. 5 and FIGS. 11, 12 and 13 are diagrams referred to for describing the user authentication method of the mobile terminal 100.

Referring to FIG. 10, the controller 180 acquires the predetermined authentication information from the memory 160 or the identification module (S201). The predetermined authentication information may be encrypted and then stored in the memory 160 or the identification module.

Accordingly, when the authentication information obtained from the memory 160 or the identification module has been encrypted, the controller 180 may decode the encrypted authentication information using the encryption key to acquire the authentication information The controller 180 receives authentication information from the user separately from the predetermined authentication information.

Figure 11:
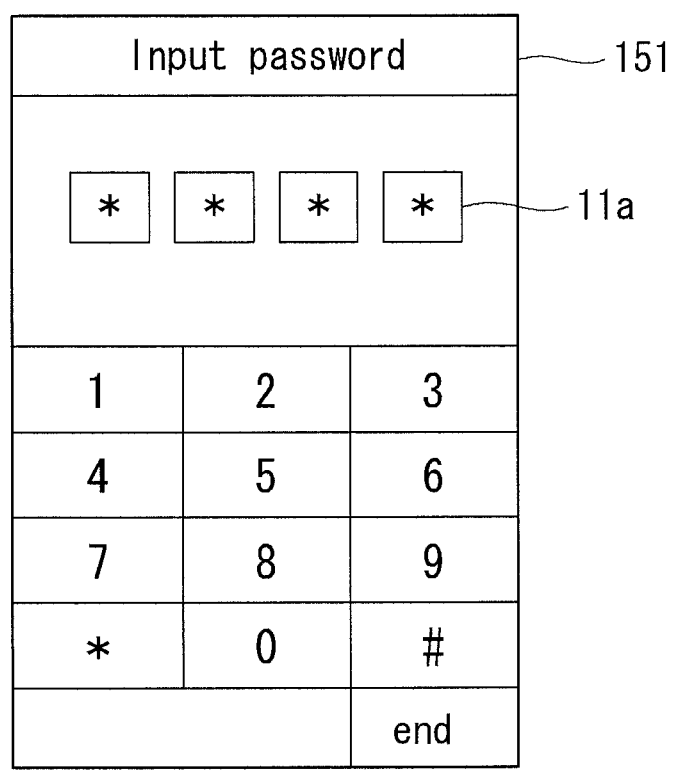
FIGS. 11 to 13 show a user authentication method for a mobile terminal.

Referring to FIG. 11, the controller 180 may display an input window 11a for inputting a password as authentication information on the screen and receive the password input by the user through the input window 11a. In the embodiments of the invention, a password is used as the authentication information facilitation of explanation.

Referring back to FIG. 10, the controller 180 compares the authentication information input by the user with the predetermined authentication information acquired in step S201 to determine validity of the authentication information input by the user (S203).

When the authentication information input by the user is not matched to the predetermined authentication information (S204), the controller 180 repeats steps S202, S203 and S204 until the number of disagreements of the authentication information input by the user and the predetermined authentication information exceeds a predetermined number or the two pieces of authentication information correspond to each other (S205).

When the number of disagreements of the authentication information input by the user and the predetermined authentication information is less than the predetermined number, the controller 180 may inform the user that the two pieces of authentication information do not matched to each other so as to induce the user to re-input the authentication information.

Figure 12:
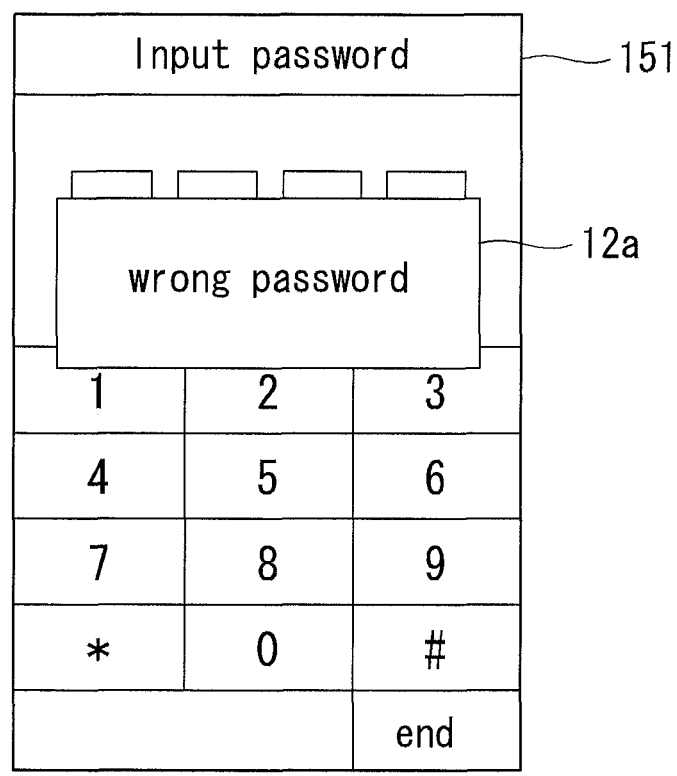

Referring to FIG. 12, when a predetermined password is different from the password input by the user, the controller 180 displays a message 12a indicating this on the screen so as to induce the user to input the password again.

Referring back to FIG. 10, when the number of disagreements of the authentication information input by the user and the predetermined authentication information exceeds the predetermined number, the controller 180 determines that user authentication ends in failure and informs the user of the failure (S206).

When the two pieces of authentication information correspond to each other, the controller 180 determines that user authentication is successful and informs the user of the success of user authentication (S207).

Referring to FIG. 8, the controller 180 may display a message 8b indicating that payment is available on the screen upon success of user authentication. While user authentication is performed unconditionally in response to the NFC payment request in FIG. 5, the present invention is not limited thereto.

According to one embodiment, the user authentication process may be selectively performed depending on a payment amount. In this case, the controller 180 may acquire information on the payment amount from the user or the payment terminal 200 and select execution of the user authentication process on the basis of the acquired information. Here, a reference amount that is a criterion of determination of execution of the user authentication process may be set by the user.

Figure 13:
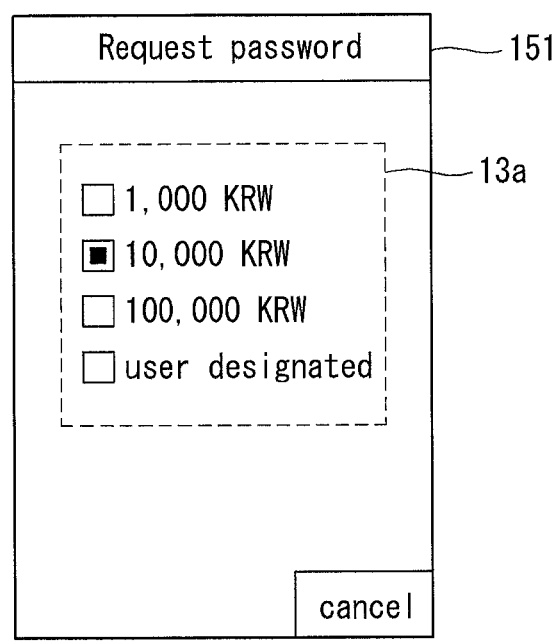

Referring to FIG. 13, the controller 180 displays a window 13a for setting the reference amount for the user authentication process involved in the NFC payment function. The controller 180 executes the user authentication process only when a request of payment of an amount larger than the reference amount set through the screen 13a is received.

Figure 14:
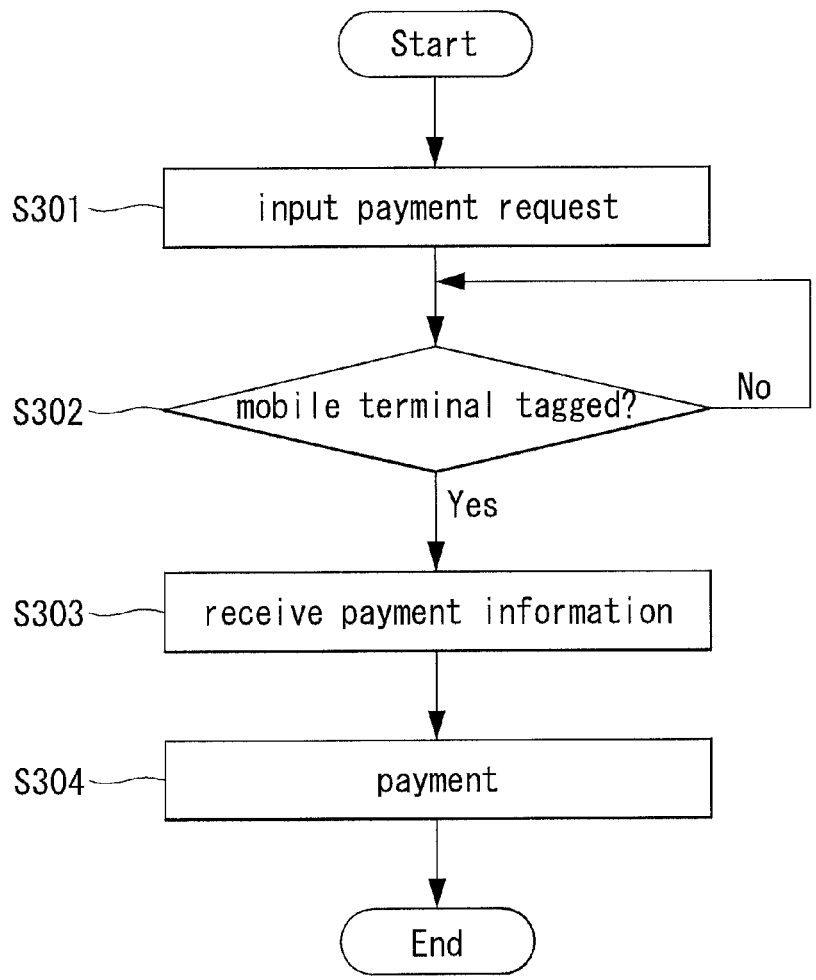
FIG. 14 shows operations included in a payment method to be performed in a payment terminal.

When the reference amount is set, as described above, the user can set such that the complicated user authentication process is omitted in case of small amount payment and is executed in case of large amount payment, to thereby improve user convenience. FIG. 14 is a flowchart illustrating the payment method of the payment terminal 200 according to the first embodiment of the invention.

Referring to FIG. 14, the controller 250 of the payment terminal 200 receives a payment request through a user input means of the input unit 220 (S301). A user of the payment terminal 200 may input information required for payment, such as a payment amount, payment item, etc., when inputting the payment request.

The controller 250 establishes a communication link with the NFC module 117 of the mobile terminal 100 through the NFC module 211 of the payment terminal 200 when the mobile terminal 100 is tagged upon success of user authentication in the mobile terminal 100 (S302).

The controller 250 receives payment information from mobile terminal 200 through the communication link (S303). If required, controller 250 may transmit information on the payment amount to mobile terminal 100 through the communication link.

The controller 250 links the payment terminal 200 to a payment server (not shown) corresponding to the received payment information through the Internet module 212 and executes a payment process with the payment server on the basis of the payment information (S304).

A second embodiment of a payment method and corresponding operations performed in mobile terminal 100 and payment terminal 200 will now be described. In this embodiment, memory 160 may store payment information. In addition, the memory 160 may store authentication information, a user image, etc. used for user authentication involved in the NFC payment function.

The authentication information and user image used for user authentication involved in the NFC payment function may be stored in the identification module connected to the mobile terminal 100. In this case, the interface 170 may acquire the authentication information and user image involved in the NFC payment function and stored in the identification module through interface with the identification module connected to the mobile terminal 100.

As in the first embodiment, the authentication information and user image may be encrypted and then stored in the memory 160 and the identification module. Accordingly, the encryption key used to decode the encrypted authentication information and user image may be stored separately from the encrypted authentication information.

According to the second embodiment, the controller 180 compares predetermined authentication information with authentication information input by the user when receiving an NFC payment request to perform user authentication. In addition, the controller 180 determines whether or not to enable the NFC payment function according to success or failure of the authentication.

The controller 180 transmits the user image previously set for NFC payment to the payment terminal 200. The user image transmitted to the payment terminal 200 may be displayed on the screen of the payment terminal 200 through the display module 230 of the payment terminal 200 such that the manager of the payment terminal 200, such as a clerk, can confirm the user image.

According to the second embodiment, controller 180 may selectively perform the above-described user authentication process depending on a payment amount or carry out the user authentication process using different pieces of authentication information depending on payment amounts.

When a plurality of pieces of authentication information is set by payment amounts, controller 180 performs the user authentication process using authentication information corresponding to a payment amount.

Figure 15:
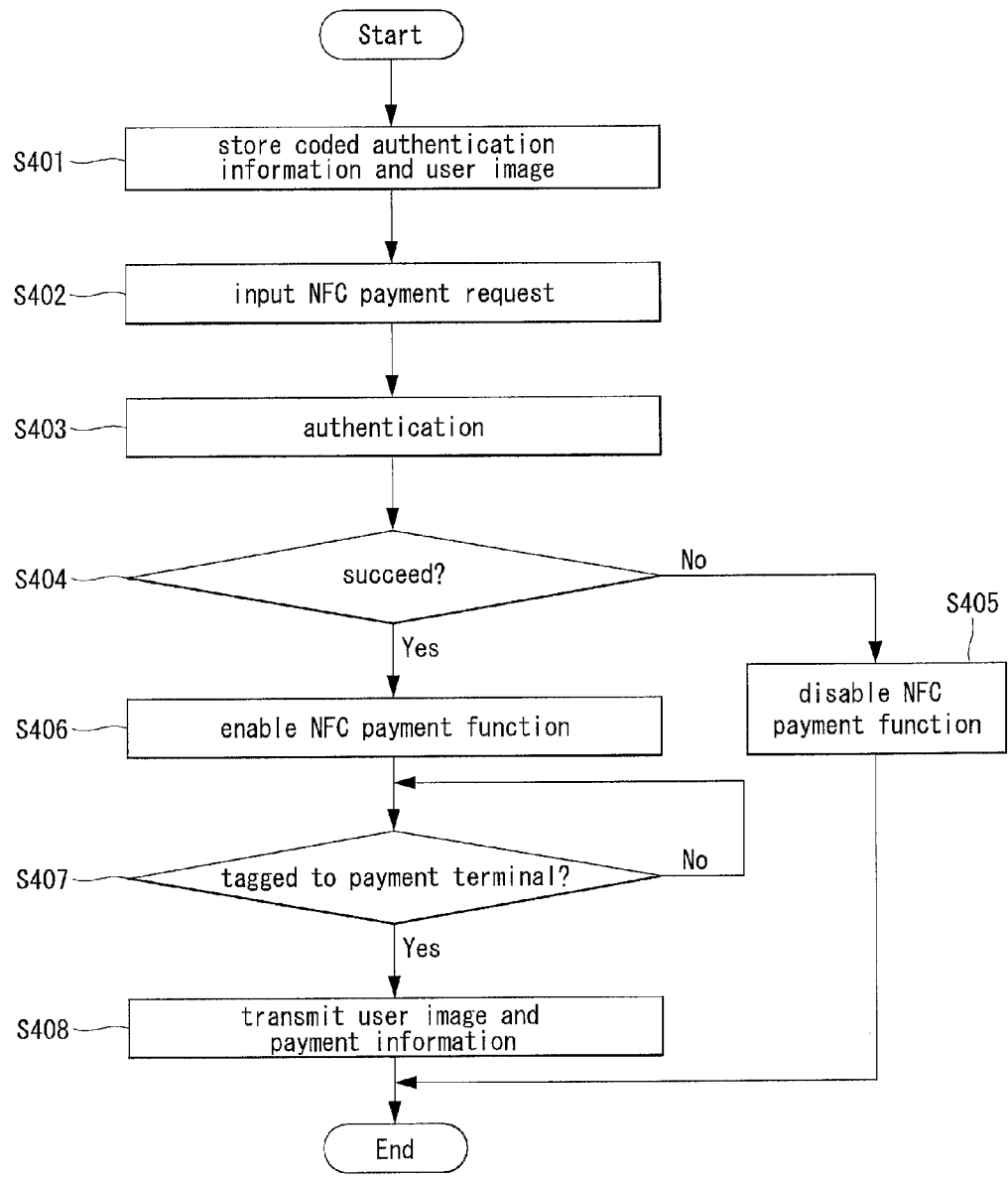
FIG. 15 shows operations in a second embodiment of a payment method.

FIG. 15 shows operations included in a second embodiment of a payment method executed by the mobile terminal 100. Steps S401, S402 and S403 in the payment method of the mobile terminal 100, shown in FIG. 15, may be similar to steps S101, S102 and S103 shown in FIG. 5.

Referring to FIG. 15, the controller 180 of the mobile terminal 100 stores authentication information and a user image in the memory 160 or the identification module connected to the mobile terminal 100 (S401).

The controller 180 performs a user authentication process (S403) upon input of a payment request using NFC (S042). The user authentication process may be performed in the same manner as the above user authentication process shown in FIG. 10.

The controller 180 disables the NFC payment function upon failure of user authentication (S404 and S405). Conversely, the controller 180 enables the NFC payment function upon success of user authentication (S404 and S406).

When the payment terminal 200 is tagged to the NFC module 117 with the NFC payment function enabled (S407), the controller 180 establishes a communication link with the NFC module of the payment terminal 200 through the NFC module 117.

The controller 180 transmits the predetermined user image and previously stored payment information to the payment terminal 200 through the communication link (S408).

The predetermined user image is involved in the NFC payment function and stored in step S401, and may be encrypted and then stored as described above. In this case, the controller 180 acquires the encrypted user image from the memory 160 or the identification module and decodes it using an encryption key. The encryption key used to decode the encrypted user image can be acquired from the identification module or an external authentication server, as described above.

When a plurality of payment means is stored in the memory 160, the controller 180 may select one of the payment means on the basis of a user input and transmit payment information corresponding to the selected payment means to the payment terminal 200 (S408).

According to the second embodiment, the payment means may be selected before or after step S402 of receiving the payment request. Otherwise, the payment means may be selected in the user authentication process (S403) upon success of user authentication.

Figure 16:
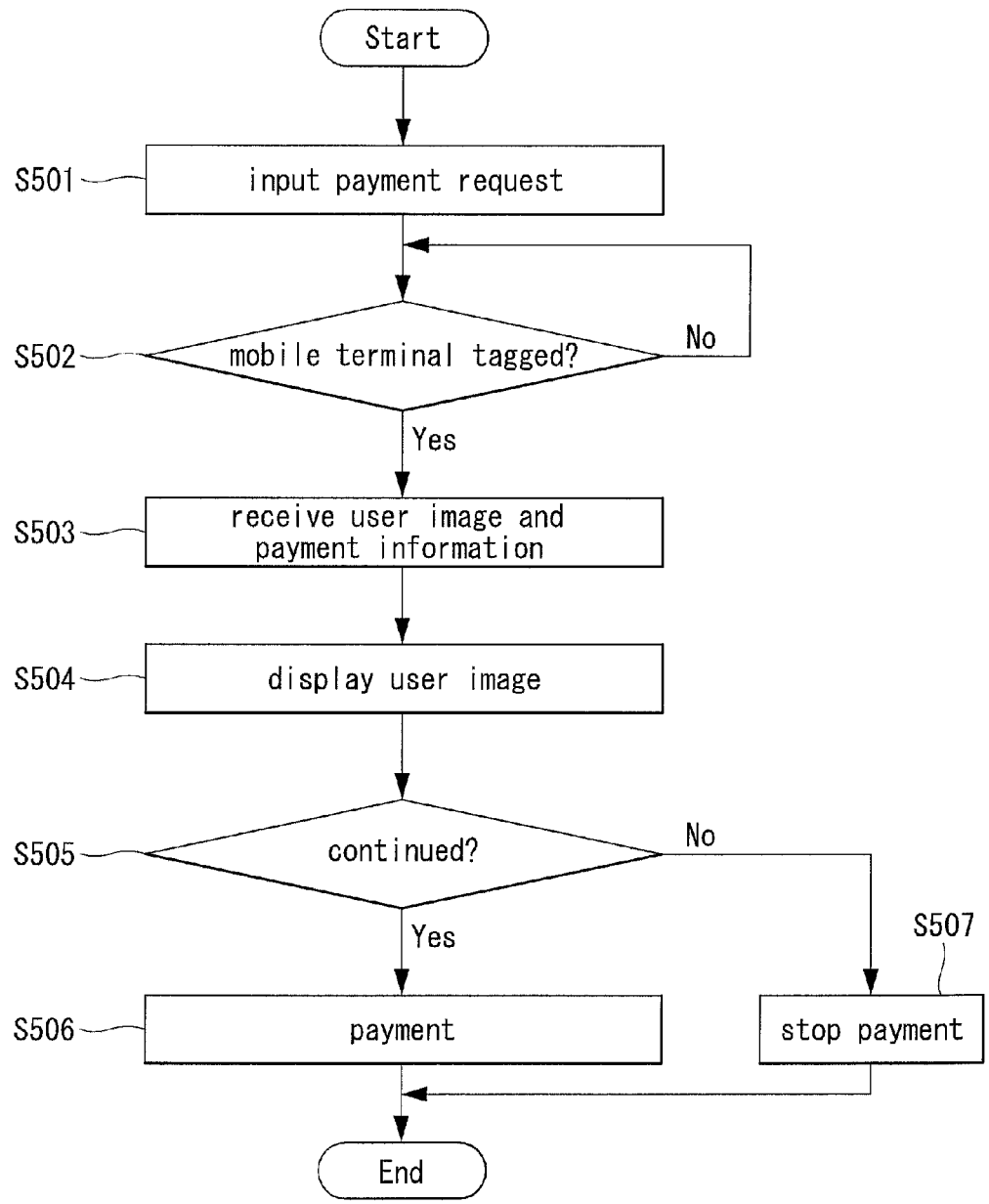
FIG. 16 shows features of the second embodiment of the payment method.

FIG. 16 shows features of the second embodiment of the payment method of the payment terminal 200. Referring to FIG. 16, the controller 250 of the payment terminal 200 receives a payment request through a user input means of the input unit 220 (S501).

The controller 250 establishes a communication link with the NFC module 117 of the mobile terminal 100 through the NFC module 211 of the payment terminal 200 when the mobile terminal 100 is tagged upon success of user authentication in the mobile terminal 100 (S502).

The controller 250 receives a user image and payment information from the mobile terminal 100 through the communication link (S503). If required, the controller 250 may transmit information on a payment amount to the mobile terminal 100 through the communication link.

The controller 250 displays the received user image on the screen of the payment terminal 200 through the display module 230 (S504). Accordingly, a user of the payment terminal 200 can compare the user image displayed on the screen with the user of the mobile terminal 100 to identify the user.

The user of the payment terminal 200 may determine whether or not to continue the payment process upon confirmation of the displayed user image. The user of the payment terminal 200 may input a control input for instructing the controller 230 to continue or end the payment process of the payment terminal 200 according to the determination result through the input unit 220.

Upon reception of the control input for instructing the controller 230 to continue the payment process from the user through the input unit 220, the controller 250 links the payment terminal 200 to a payment server (not shown) corresponding to the received payment information through the Internet module 212 and executes the payment process with the payment server based on the payment information (S505 and S506).

Upon reception of the control input for instructing the payment process to end from the user through the input unit 220, the controller 250 stops the payment process and displays information indicating that the payment process is stopped on the screen of the payment terminal 200 (S507).

A third embodiment of a payment method and corresponding operations performed by the mobile terminal 100 and payment terminal 200 will now be described. In this embodiment, memory 160 may store payment information. In addition, the memory 160 may store authentication information, a user image, etc. used for user authentication involved in the NFC payment function.

The authentication information and user image used for user authentication involved in the NFC payment function may be stored in the identification module connected to the mobile terminal 100. In this case, the interface 170 may acquire the authentication information and user image involved in the NFC payment function and stored in the identification module through interface with the identification module connected to the mobile terminal 100.

As in the first embodiment, the authentication information and user image may be encrypted and then stored in the memory 160 and the identification module. Accordingly, the encryption key used to decode the encrypted authentication information and user image may be stored separately from the encrypted authentication information.

According to the third embodiment, the controller 180 acquires encrypted authentication information and user image from the memory 160 or the identification module when the NFC module 117 is tagged to the NFC module 210 of the payment terminal 200. The controller 180 may transmit the acquired authentication information with payment information to the payment terminal 200.

The authentication information may be transmitted being encrypted to the payment terminal 200. Otherwise, the authentication information may be decrypted by the controller 180 and then transmitted.

When the authentication information is decrypted and then transmitted, the controller 180 decodes the encrypted authentication information and transmits the decrypted authentication information to the payment terminal 200.

The controller 180 may display the acquired user image involved in NFC payment on the screen of the mobile terminal 100 such that the manager of the payment terminal 200, such as a clerk, can identify the user of the mobile terminal 100. That is, the controller 180 may decode the encrypted user image using an encryption key and display the decrypted user image on the screen of the mobile terminal 100 through the display module 151.

According to the third embodiment, the controller 180 may selectively transmit the authentication information to the payment terminal 200 depending on a payment amount. In this case, the controller 180 transmits the authentication information to the payment terminal 200 only when a payment amount exceeds a predetermined reference amount. Here, the reference amount that is a criterion of determination of transmission of the authentication information may be set by the user.

According to the third embodiment, the controller 180 may transmit different pieces of authentication information to the payment terminal 200 according to payment amounts. That is, the controller 180 acquires authentication information corresponding to a payment amount, stored in the memory 160 or identification module, from the memory 160 or identification module and transmits the authentication information to the payment terminal 200.

Figure 17:
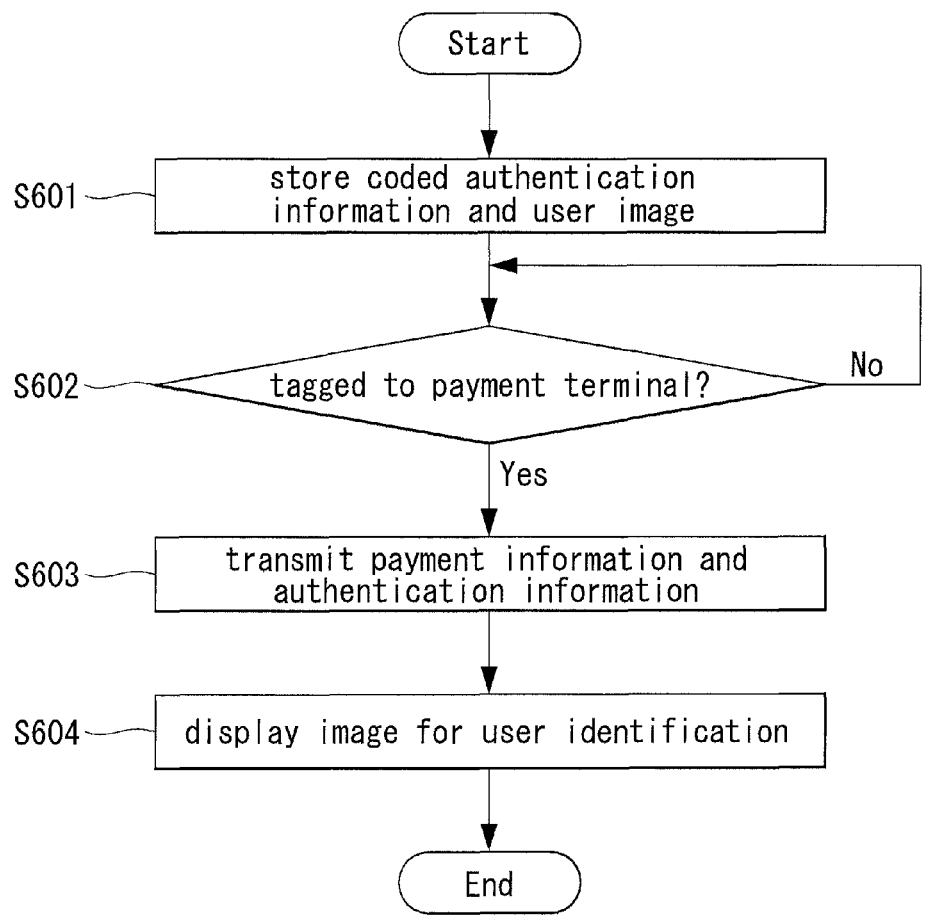
FIG. 17 shows operations in a third embodiment of a payment method.

FIG. 17 shows features of the third embodiment of the payment method executed by mobile terminal 100. Referring to FIG. 17, the controller 180 stores encrypted authentication information and user image in the memory 160 or the identification module connected to the mobile terminal 100 (S601).

The authentication information and user image may be encrypted in an approved place through an approved method and then stored in the memory 160 or the identification module, as described above. An encryption key used to decode the encrypted authentication information and user image may be stored may be stored in the memory 160 or the identification module connected to the mobile terminal 100 in step S601.

Referring to FIG. 17, the controller 180 may receive an NFC payment request from the payment terminal 200 when the payment terminal 200 is tagged to the NFC module 117 (S602), that is, when the payment terminal 200 accesses to the mobile terminal 100 within a predetermined distance.

Accordingly, the controller 180 acquires predetermined authentication information. The controller 180 transmits the acquired authentication information with payment information to the payment terminal 200 (S603). Then, the payment terminal 200 performs user authentication using the authentication information received from the mobile terminal 100.

In addition, the controller 180 acquires the user image used for user identification involved in the NFC payment function. The controller 180 displays the acquired user image on the screen of the mobile terminal 100 through the display module 151, as shown in FIG. 8 (S604).

The user image used for user identification involved in the NFC payment function may be encrypted and stored in the memory 160 or the identification module, as described above.

Accordingly, the controller 180 acquires the encrypted user image from the memory 160 or the identification module and decodes it using an encryption key. The encryption key used to decode the user image may be obtained from the identification module or the external authentication server as described above.

Figure 18:
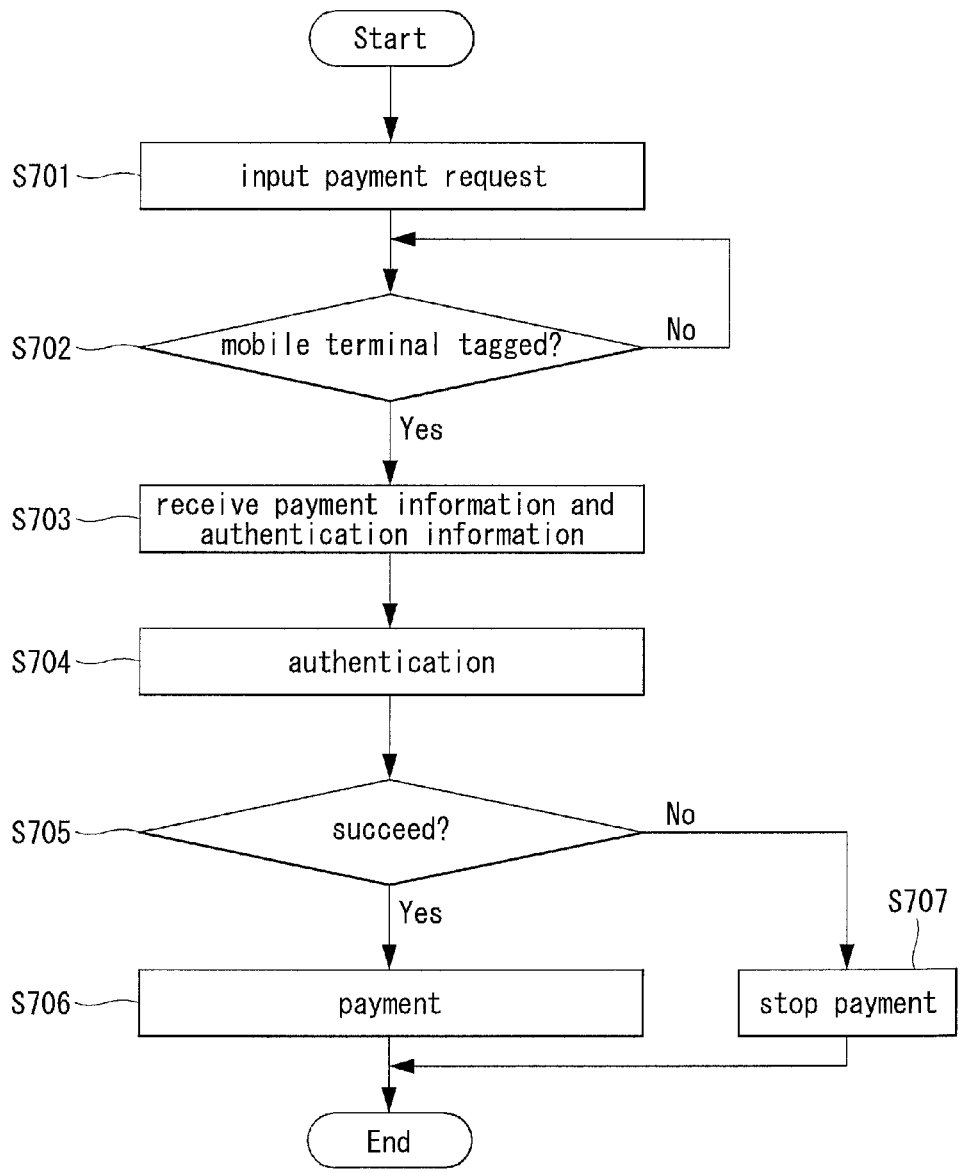
FIG. 18 shows features of the third embodiment of the payment method.

FIG. 18 shows features of a third embodiment of the payment method executed by the payment terminal 200. Referring to FIG. 18, the controller 250 of the payment terminal 200 receives a payment request through the user input means of the user input unit 220 (S701).

The controller 250 establishes a communication link with the NFC module 117 of the mobile terminal 100 through the NFC module 211 of the payment terminal 200 when the mobile terminal 100 is tagged (S702).

The controller 250 transmits a payment request to the mobile terminal 100 through the communication link and receives payment information and authentication information from the mobile terminal 100 (S703). If required, the controller 250 may transmit information on a payment amount to the mobile terminal 100 through the communication link.

The controller 250 performs authentication of the user of the mobile terminal 100 using the received authentication information (S704). The user authentication process will be described later with reference to FIG. 19.

Referring to FIG. 18, upon success of user authentication using the received authentication information, the controller 250 links the payment terminal 200 to a payment server (not shown) corresponding to the payment information received from the mobile terminal 100 through the Internet module 212 and performs a payment process with the payment server on the basis of the payment information (S705 and S706).

Conversely, upon failure of user authentication, the controller 250 stops the payment process and displays information indicating the interruption of payment on the screen of the payment terminal 200 (S707)

Figure 19:
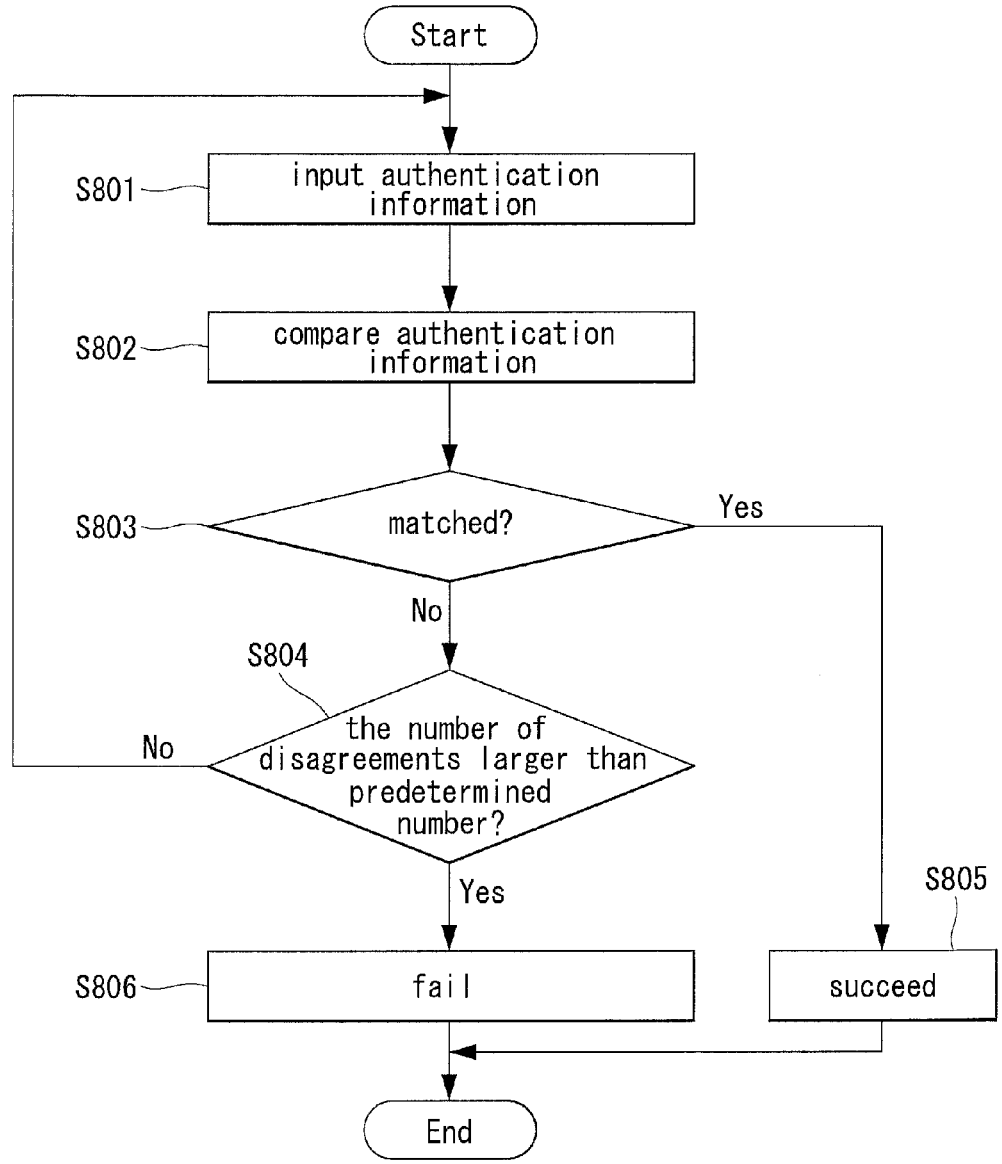
FIG. 19 shows an authentication process performed by a payment terminal.

FIG. 19 shows operations in an embodiment of an authentication process performed by the payment terminal 200 in step S704 shown in FIG. 18. Referring to FIG. 19, the controller 250 receives authentication information from the user of the mobile terminal 100 through the input unit (220) (S801).

The controller 250 compares the authentication information received from the mobile terminal 100 in step S703 shown in FIG. 18 with the authentication information received from the user of the mobile terminal 100 to perform user authentication (S802).

The authentication information received from the mobile terminal 100 in step S703 shown in FIG. 18 may be encrypted authentication information. When the received authentication information is encrypted authentication information, the controller 250 decodes the received authentication information using an encryption key which can be acquired from an authentication server connected through the Internet module 212.

Referring back to FIG. 19, if the authentication information received from the mobile terminal 100 does not correspond to the authentication information input by the user of the mobile terminal 100 (S803), the controller 250 repeats steps S801, S802 and S803 until the number of disagreements of the two pieces of authentication information exceeds a predetermined number or the two pieces of authentication information correspond to each other (S804).

When the number of disagreements of the two pieces of authentication information is less than the predetermined number, the controller 250 may display information indicating disagreement of the authentication information on the screen of the payment terminal 200 to induce the user of the mobile terminal 100 to input authentication information again.

When the number of disagreements of the two pieces of authentication information exceeds the predetermined number, the controller 250 determines that user authentication ends in failure and informs the user of the failure (S805).

When the two pieces of authentication information correspond to each other, the controller 250 determines that user authentication is successful and displays information indicating the success on the screen of the payment terminal 200 (S806).

A fourth embodiment of a payment method and corresponding operations by mobile terminal 100 and payment terminal 200 will now be described. According to the fourth embodiment, the memory 160 may store payment information. In addition, the memory 160 may store authentication information, a user image, etc. used for user authentication involved in the NFC payment function.

The authentication information and user image used for user authentication involved in the NFC payment function may be stored in the identification module connected to the mobile terminal 100. In this case, the interface 170 may acquire the authentication information and user image involved in the NFC payment function and stored in the identification module through interface with the identification module connected to the mobile terminal 100.

As in the first embodiment, the authentication information and user image may be encrypted and then stored in the memory 160 and the identification module. Accordingly, the encryption key used to decode the encrypted authentication information and user image may be stored separately from the encrypted authentication information.

According to the fourth embodiment, the controller 180 acquires encrypted authentication information and user image from the memory 160 or the identification module when the NFC module 117 is tagged to the NFC module 210 of the payment terminal 200. The controller 180 may transmit the acquired authentication information and user image with payment information to the payment terminal 200.

The authentication information and user image may be transmitted being encrypted to the payment terminal 200. Otherwise, the authentication information and user image may be decrypted by the controller 180 and then transmitted.

When the authentication information and user image are decrypted and then transmitted, the controller 180 decodes the encrypted authentication information and user image and transmits the decrypted authentication information and user image to the payment terminal 200.

According to the fourth embodiment, the controller 180 may selectively transmit the authentication information to the payment terminal 200 depending on a payment amount. In this case, the controller 180 transmits the authentication information to the payment terminal 200 only when a payment amount exceeds a predetermined reference amount. Here, the reference amount that is a criterion of determination of transmission of the authentication information may be set by the user.

According to the fourth embodiment, the controller 180 may transmit different pieces of authentication information to the payment terminal 200 according to payment amounts. That is, the controller 180 acquires authentication information corresponding to a payment amount, stored in the memory 160 or identification module, from the memory 160 or identification module and transmits the authentication information to the payment terminal 200.

Figure 20:
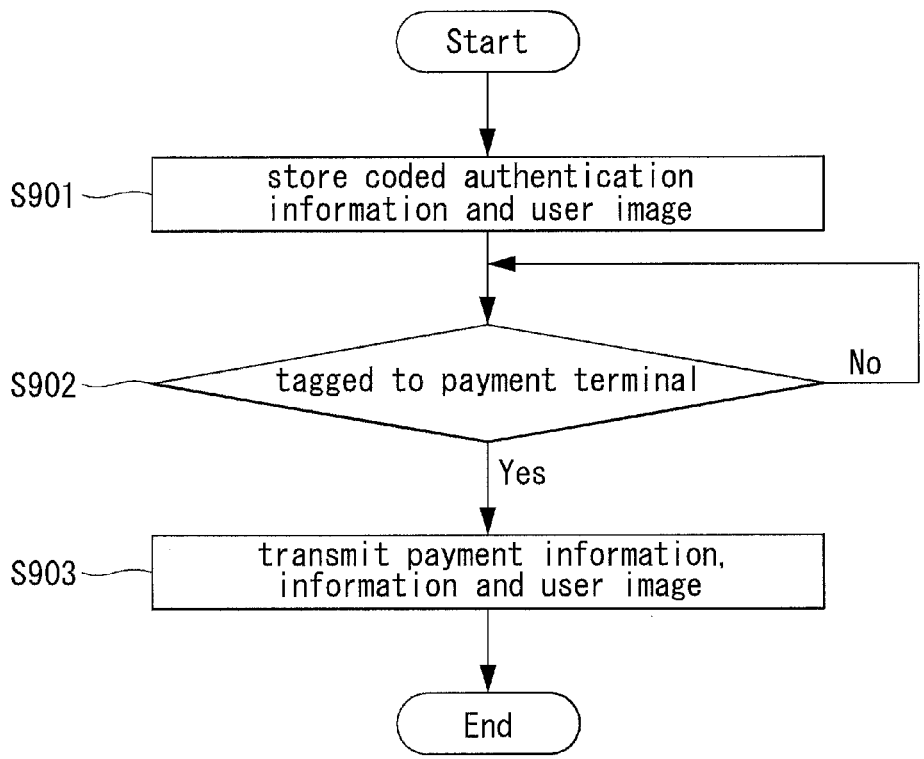
FIG. 20 shows operations in a fourth embodiment of a payment method.

FIG. 20 shows operations in a fourth embodiment of a payment method executed by mobile terminal 100. Referring to FIG. 20, the controller 180 stores encrypted authentication information and user image in the memory 160 or the identification module connected to the mobile terminal 100 (S901).

The authentication information and user image may be encrypted in an approved place through an approved method and then stored in the memory 160 or the identification module, as described above.

An encryption key used to decode the encrypted authentication information and user image may be stored may be stored in the memory 160 or the identification module connected to the mobile terminal 100 in step S901.

The controller 180 may receive an NFC payment request from the payment terminal 200 when the payment terminal 200 is tagged to the NFC module 117 (S902), that is, when the payment terminal 200 accesses to the mobile terminal 100 within a predetermined distance.

Accordingly, the controller 180 acquires predetermined authentication information and user image involved in the NFC payment function. The controller 180 transmits the acquired authentication information and user image with payment information to the payment terminal 200 (S903). Then, the payment terminal 200 performs user authentication using the authentication information received from the mobile terminal 100 and displays the user image received from the mobile terminal 100 on the screen such that the user of the payment terminal 200 can perform user identification.

Figure 21:
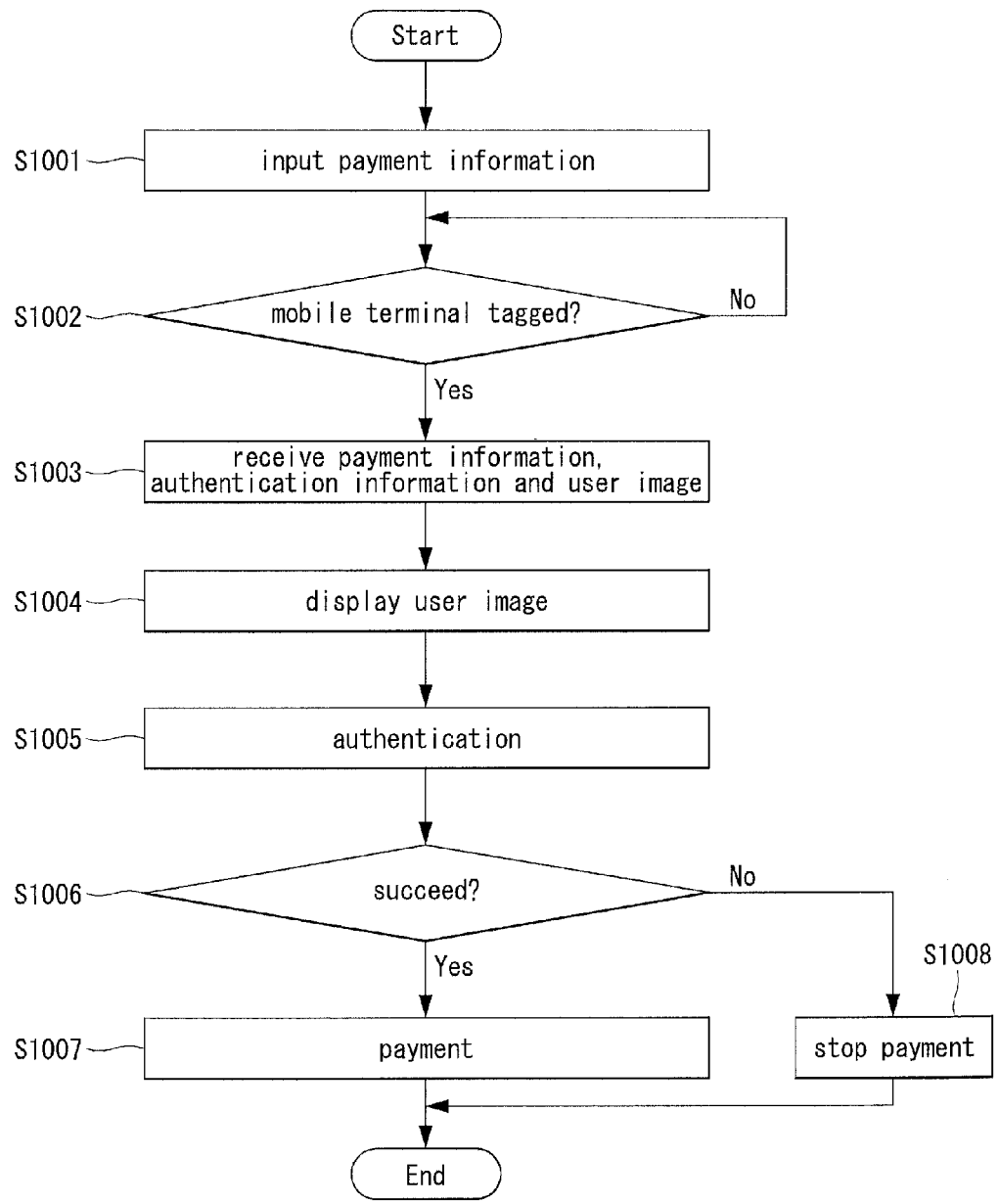
FIG. 21 shows features of the fourth embodiment of the payment method.

FIG. 21 shows operations in a fourth embodiment of a payment method executed by the payment terminal 200. Referring to FIG. 21, the controller 250 of the payment terminal 200 receives a payment request through the user input means of the user input unit 220 (S1001).

The controller 250 establishes a communication link with the NFC module 117 of the mobile terminal 100 through the NFC module 211 of the payment terminal 200 when the mobile terminal 100 is tagged (S1002).

The controller 250 transmits a payment request to the mobile terminal 100 through the communication link and receives payment information, authentication information and a user image from the mobile terminal 100 (S1003). If required, the controller 250 may transmit information on a payment amount to the mobile terminal 100 through the communication link.

The controller 250 displays the received user image on the screen of the payment terminal 200 through the display module 230 (S1004). Accordingly, the user of the payment terminal 200 can identify the user by comparing the user image display on the screen with the user of the mobile terminal 100.

The controller 250 performs authentication of the user of the mobile terminal 100 using the received authentication information (S1005). The user authentication process may be similar to the authentication process shown in FIG. 19.

Upon success of user authentication in step S1005, the controller 250 links the payment terminal 200 to a payment server (not shown) corresponding to the payment information received from the mobile terminal 100 through the Internet module 212 and performs a payment process with the payment server on the basis of the payment information (S1006 and S1007).

Conversely, upon failure of user authentication, the controller 250 stops the payment process and displays information indicating the interruption of payment on the screen of the payment terminal 200 (S1006 and S1008).

According to the above-mentioned embodiments, when the user wants to pay a predetermined amount using the NFC payment function of the mobile terminal 100, the safety of payment using NFC can be enhanced by performing user authentication using authentication information for authenticating the user and user identification using a user image.

In addition, the authentication information and user image used for identification may be encrypted and stored, and the encryption key used to decode the encrypted authentication and user image is stored separately from the encrypted authentication information and user image. Thus, it is possible to prevent the encrypted authentication information and user image and the encryption key from being exposed simultaneously.

Furthermore, user identification can be simplified by minimizing the number of user inputs during a user identification procedure.

The disclosed payment method for the mobile terminal may be written as computer programs and may be implemented in digital microprocessors that execute the programs using a computer readable recording medium. The payment method for the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

In accordance with one embodiment, a mobile terminal and payment method are provided for achieving safe and easy payment when a user wants to pay an amount of money using local area communication.

In accordance with another embodiment, a mobile terminal includes a memory storing payment information, a local area communication module, and a controller configured to compare predetermined first authentication information with second authentication information input by a user to enable/disable a payment function using the local area communication module and transmit the payment information to a payment terminal located within a predetermined distance if linked with the payment terminal through the local area communication module when the payment function is enabled.

In accordance with another embodiment, a mobile terminal includes a memory storing payment information, a local area communication module, and a controller configured to transmit predetermined first authentication information with the payment information to a payment terminal located within a predetermined distance when linked with the payment terminal through the local area communication module such that the payment terminal performs user authentication.

In accordance with another embodiment, a payment method of a mobile terminal equipped with a NFC module includes: acquiring predetermined first authentication information; receiving second authentication information from a user; comparing the first authentication information with the second authentication information to enable/disable a payment function using the NFC module; and transmitting payment information to a payment terminal located within a predetermined distance if the mobile terminal is linked with the payment terminal through the NFC module when the payment function is enabled.

In accordance with another embodiment, a payment method of a mobile terminal equipped with a NFC module includes: connecting the mobile terminal with a payment terminal located within a predetermined distance through the NFC module; acquiring predetermined authentication information; and transmitting the authentication information with payment information to the payment terminal such that the payment terminal performs user authentication.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a memory to store payment information;
   a display module;
   a short-range communication interface; and
   a controller to:
      perform a first user authentication when a payment request is received through the short-range communication interface,
      perform a second user authentication when the first user authentication is successful,
      establish a connection with a payment terminal through the short-range communication interface when the second user authentication is successful, and
      transmit payment information to the payment terminal through the short-range communication interface;
   wherein the first user authentication includes:
      obtain the payment request through the short-range communication interface,
      obtain predetermined first authentication information,
      obtain second authentication information separately from the predetermined first authentication information, and
      compare the predetermined first authentication information with the second authentication information,
   wherein the second user authentication includes:
      obtain a user image for user identification through the short range communication interface, and
      transmit the user image to the payment terminal for displaying on a screen of the payment terminal,
      wherein the authentication information and the user image are encrypted, and a key for decoding the encrypted authentication information is stored in another place that includes at least one of an identification module and an external authentication server.

2. The mobile terminal of claim 1, wherein the short-range communication interface establishes a communication link in a range of substantially 10 centimeters or less.

3. The mobile terminal of claim 2, wherein the short-range communication interface is a near field communication (NFC) interface.

4. The mobile terminal of claim 1, further comprising an input unit of the mobile terminal.

5. The mobile terminal of claim 1, further comprising:
   an interface to establish a connection between the mobile terminal and an identification storage that stores the first authentication information, wherein:
   the first authentication information is stored in an encrypted form, and
   the controller acquires the first authentication information by decrypting the encrypted first authentication information with an encryption key.

6. The mobile terminal of claim 5, further comprising:
   a mobile communication module or a wireless Internet module,
   wherein the controller acquires the encryption key from an authentication server connected through the mobile communication module or the wireless Internet module, or the identification module.

7. The mobile terminal of claim 1, wherein:
   when a payment amount exceeds a predetermined amount, the controller enables or disables a payment function based on the comparing result of the first and second authentication information, and
   when the payment amount is less than the predetermined amount, the controller enables the payment function regardless of the comparing result of the first and second authentication information.

8. The mobile terminal of claim 1, wherein the short-range communication interface includes a NFC interface.

9. The mobile terminal of claim 1, wherein the second user authentication is performed after the first user authentication is determined to be successful.

10. The mobile terminal of claim 9, wherein performing the second user authentication occurs after the first user authentication is determined to be successful.

11. A payment method for a mobile terminal, comprising:
    performing a first user authentication when a payment request is received through a short-range communication interface;
    performing a second user authentication when the first user authentication is successful;
    establishing a connection with a payment terminal through the short-range communication interface when the second user authentication is successful; and
    transmitting payment information to the payment terminal through the short-range communication interface;
    wherein performing the first user authentication includes:
       obtaining the payment request through the short-range communication interface,
       obtaining predetermined first authentication information,
       obtaining second authentication information separately from the predetermined first authentication information, and
       comparing the predetermined first authentication information with the second authentication information,
    wherein performing the second user authentication includes:
       obtaining a user image for user identification through the short range communication interface, and
       transmitting the user image to the payment terminal for displaying on a screen of the payment terminal,
    wherein the authentication information and the user image are encrypted, and a key for decoding the encrypted authentication information is stored at another location, wherein the another location is at least one of an identification module and an external authentication server.

12. The method of claim 11, wherein the short-range communication interface has a range of substantially 10 centimeters or less.

* * * * *